March 2, 1965 K. H. CONLEY ETAL 3,171,604
ROTARY MILL
Filed Jan. 29, 1962 4 Sheets-Sheet 1

INVENTORS.
KURT H. CONLEY
ARNOLD J. TENNER
CURTIS C. WALLACE, JR.
BY
Nelson E. Kimmelman
ATTORNEY March 2, 1965 K. H. CONLEY ETAL 3,171,604
ROTARY MILL
Filed Jan. 29, 1962 4 Sheets-Sheet 2

INVENTORS.
KURT H. CONLEY
ARNOLD J. TENNER
BY CURTIS C. WALLACE, JR.

Nelson E. Kimmelman
ATTORNEY

INVENTORS.
KURT H. CONLEY
ARNOLD J. TENNER
CURTIS C. WALLACE, JR.
BY
Nelson E. Kimmelman
ATTORNEY March 2, 1965   K. H. CONLEY ETAL   3,171,604
ROTARY MILL
Filed Jan. 29, 1962   4 Sheets-Sheet 4

INVENTORS.
KURT H. CONLEY
ARNOLD J. TENNER
BY   CURTIS C. WALLACE, JR.

Nelson E. Kimmelman
ATTORNEY

United States Patent Office 3,171,604
Patented Mar. 2, 1965

3,171,604
ROTARY MILL
Kurt H. Conley, Hamden, and Arnold J. Tenner, West Haven, Conn., and Curtis C. Wallace, Jr., North Star, Newark, Del., assignors to Entoleter, Inc., New Haven, Conn., a corporation of Delaware
Filed Jan. 29, 1962, Ser. No. 169,483
25 Claims. (Cl. 241—188)

This invention relates to rotary processing equipment and in particular to a high-speed, easily assembled centrifugal impacting machine.

Centrifugal impacting machines are well-known in industry and have been used for processing many types of products such as flour, oats, plastics and other materials both natural and synthetic. Advances in this art have made possible ever-increasing speeds of the rotary processing element of these machines, i.e., the rotor, and have also enlarged the number of uses to which these machines may be put as well as the number of products that may be processed thereby. As the speed of the machines was increased, it was necessary to provide greater structural strength to withstand the greater forces generated. It also became necessary to provide for cooling and for noise insulation because of the very high rotor speeds. Furthermore, as the machines found more acceptance in the chemical industry for processing various chemicals, it became more important to provide a machine which could be readily disassembled once a particular product (or mixture of products) had been processed so that all traces of that product could be cleaned out of the machine lest they contaminate the next different product to be processed. Easy disassembly and re-assembly also promoted ease of repair and maintenance with a consequent reduction in the "down-time" for these machines and therefore greater productivity.

The following are some of the objects of the present invention:

(1) To provide an improved and strengthened rotary processing machine capable of operating at high speeds with the utmost safety.

(2) To provide an improved centrifugal impacting machine operable at high speeds and having facilities for cooling.

(3) To provide an improved centrifugal impacting machine capable of easy assembly and disassembly.

(4) To provide an improved high-speed centrifugal impacting machine having effective noise-insulation features.

(5) To provide an improved centrifugal impacting machine constructed for ease of cleaning and replacement of parts to prevent contamination of the products to be processed therein.

(6) To provide an improved centrifugal impacting machine having means therein for cutting, breaking up, or premixing the input material before it is subjected to the action of the rotating impacting elements.

Other objects of the invention will also occur to those skilled in the art from an examination of the specification, claims and drawings herein in which:

In accordance with our invention we provide a centrifugal impacting machine having a top rotor housing member provided with a demountable and replaceable input chute. Depending from this top member and easily demountable therefrom is a top plate. A liner, which is also suspended from the top of the rotor housing, also helps to support the top plate from below and is provided with a number of concentric rows of stationary, downwardly-extending impacting elements. A number of concentric rows of upwardly-extending impacting elements are mounted on a rotor which is mounted on a shaft which passes through an aperture in the top of the rotor housing. The rows of upward impacting elements are interspersed between the rows of downward impacting elements. Affixed to the hub of the rotor is a cutter-distributor member which has a number of projections located at its periphery which are rotated just under the lower edge of the demountable input chute. The cutter-distributor member helps to impel the input material outwardly and also helps to break up any agglomerative particles of the input material before they are flung outwardly to the rows of impacting elements. A hopper is disposed below the liner in abutting relation and is suspended from the top of the rotor housing by a number of downwardly extending winged bolts. If desired, the hopper may be cooled by means of a pipe which is wound spirally around the hopper and is affixed to the outer surface thereof. An external shielding member surrounds the spiral pipe at a predetermined distance therefrom to help in temperature and noise insulation.

*Overall structure*

Figure 1:
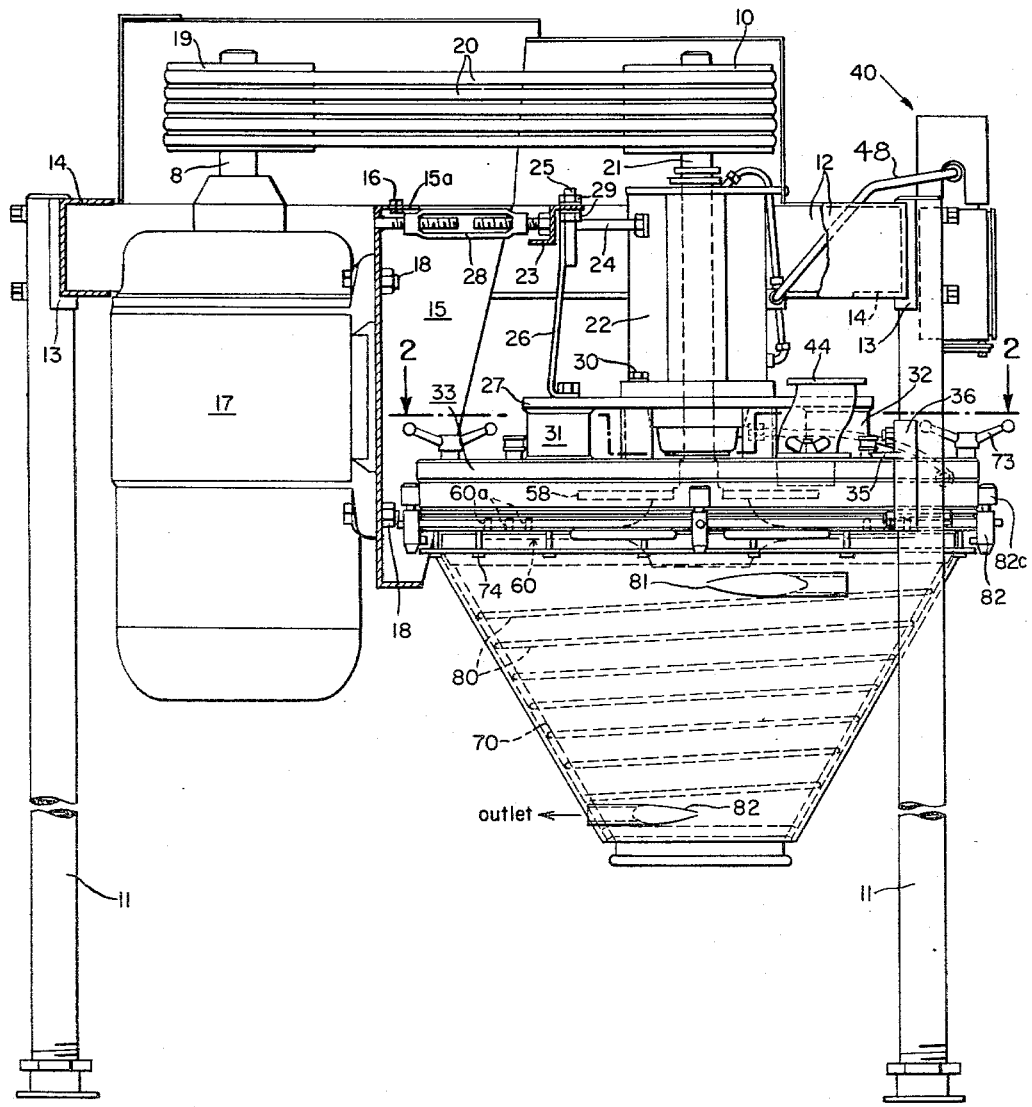
FIGURE 1 is a side elevation view, partly in section, of a centrifugal impacting machine constructed in accordance with our invention.

Referring primarily to FIG. 1, the overall machine will first be explained generally to show a typical environment for our invention. A selected number say, four, of supporting posts 11 are provided which rest upon a supporting base. Two longitudinal C-beams 12 are connected, as by welding, to four curved socket members 13 which are affixed by an desired method to the four posts 11. Two parallel C-beams 14 are disposed at each end of the supporting structure transverse to the two longitudinal beams 12 and are affixed as by welding to the posts 11.

Figure 3:
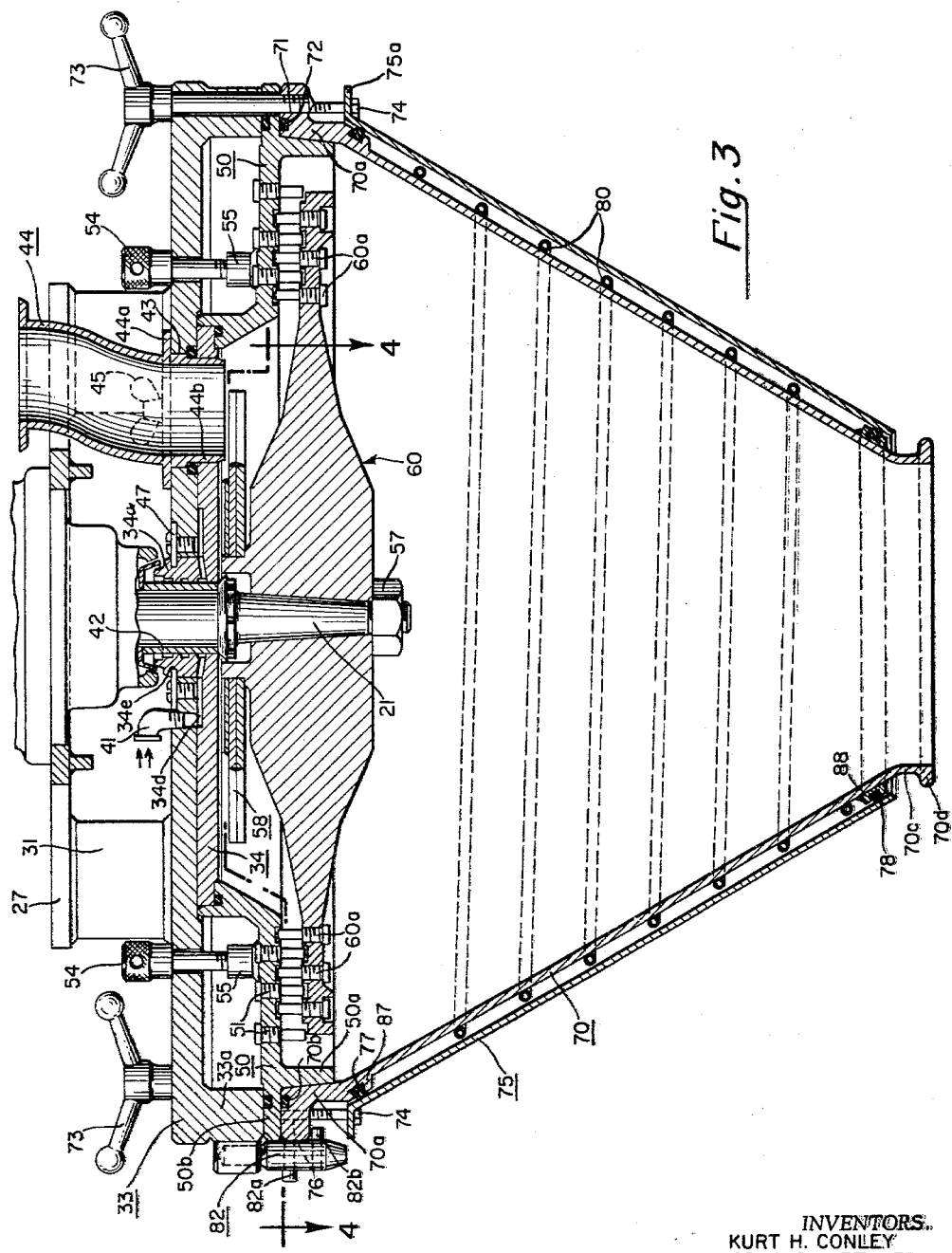
FIGURE 3 is a sectional view of the rotor housing, rotor, and hopper taken along the section line 3—3 in FIG. 2 in the direction of the arrows shown.
Figure 6:
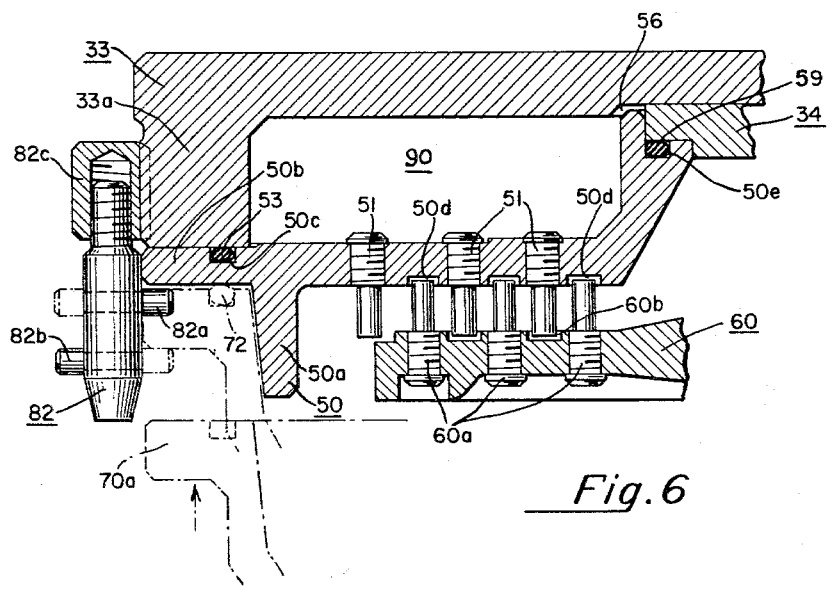
FIGURE 6 is a sectional view of part of the apparatus shown in FIG. 4 taken along the line 6—6 in FIG. 4 in the direction indicated by the arrows.

Suspended from the beams 12 is a vertical support member 15 which has a flanged portion 15a which spans the two beams 12 and is affixed thereto by bolts 16. A heavy duty motor 17 is bolted to the member 15 by bolts 18. Longitudinal slots (not shown) are provided in 15a through which bolts 16 also pass. Motor 17 has a rotating shaft 8 to which is affixed a sheave 19. A number of endless drive belts 20 engage a sheave 19 and the rotor sheave 10. The sheave 10 is affixed to the rotor spindle 21 which passes downward through a bearing housing 22 that is affixed to an S-sectioned beam 23 by a bracing member 24 to resist torque in a horizontal plane. The S-beam 23 spans between the longitudinal beams 12 and is welded at each of its ends thereto. Studs 25 pass through holes in the upper horizontal part of the beams 12 and are welded at their lower ends to a generally L-sectioned plate 26 to permit adjustment of the vertical position of the member 27 for levelling and support purposes. A turnbuckle 28 connects plate 15 to the S-beam 23 to permit adjustment of the spacing between motor 17 and the housing 22 thereby regulating the tension on the drive belts 20. When the desired spacing is achieved, the nuts associated with bolts 16 are tightened to immobilize the portion 15a of plate 15. The lower end of plate 26 is bolted to a horizontal member 27 on which the lower end of bearing housing 22 rests and to which it is bolted by bolts 30. The under side of member 27 is welded to a number of vertical support members 31 and 32 whose lower ends are welded to the upper surface of the top 33 of the rotor housing. The top 33 is provided with a central aperture (see FIG. 3) through which part of the top plate 34 and the lower part of the rotor spindle 21 pass (FIG. 3). The top 33 is generally circular and has a downwardly projecting peripheral section 33a (FIGS. 3 and 6). The top 33 is also supported by two members 35 that are welded to or are integral with sockets 36 that are bolted to the two posts 11 at the right end of the supporting structure (similar to the sockets 13) which also helps to resist the high horizontal torque produced by the spinning of the high speed rotor. A lubrication mechanism shown generally at the numeral 40 provides oil mist lubrication via tubing 48 to the bearings in housing 22.

Top plate and chute

Figure 4:
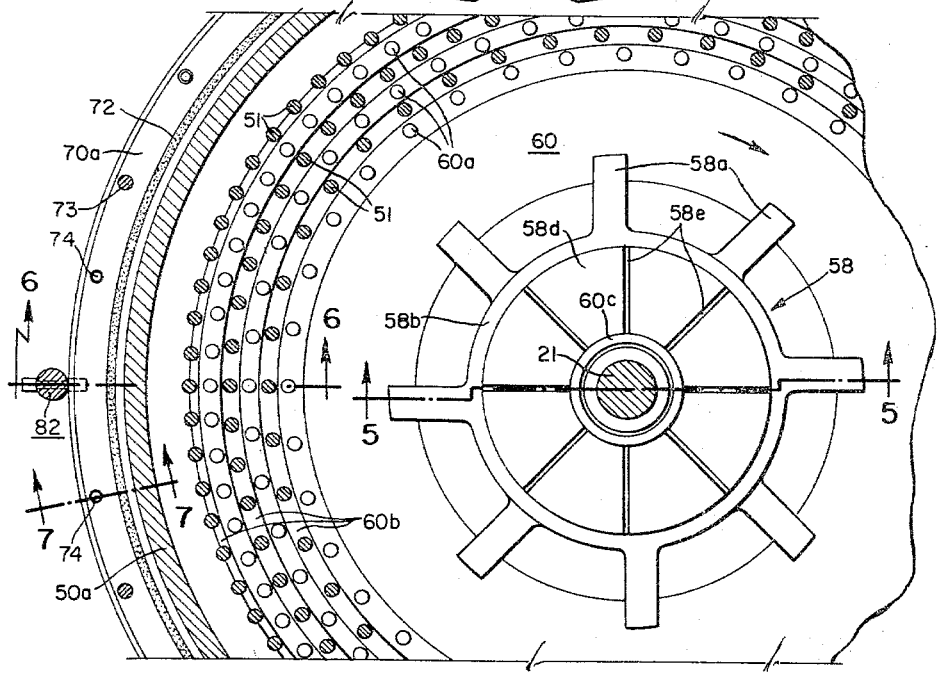
FIGURE 4 is a partly sectional fragmentary view of the apparatus shown in FIG. 3 taken along the line 4—4 in FIG. 3 in the direction indicated by the arrows.
Figure 5:
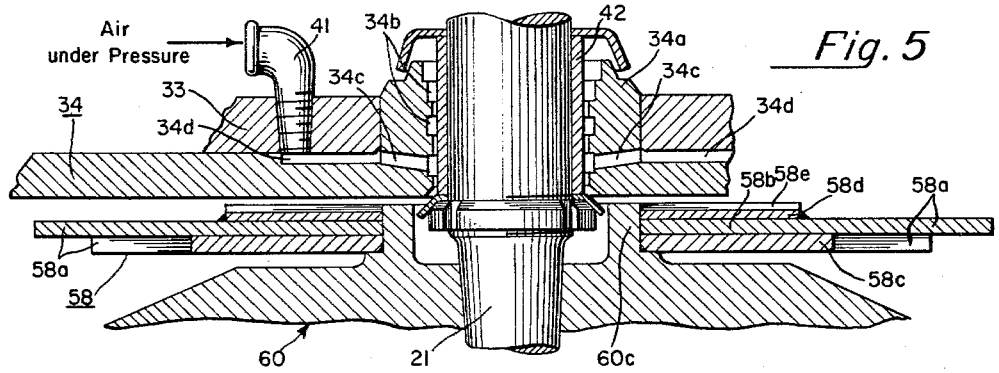
FIGURE 5 is a sectional view of part of the apparatus shown in FIG. 4 taken along the line 5—5 in FIG. 4 in the direction indicated by the arrows.

Turning now to FIGS. 2, 3, 4, 5, 6 and 7, our invention will be explained in some detail. As shown in FIGS. 3 and 5, there is an essentially circular top plate 34 having an upwardly extending and apertured collar portion 34a through which the lower part of the spindle 21 passes. As shown in enlarged view in FIG. 5 the interior surface of the aperture in the collar 34a is provided with a number of essentially circular grooves 34b. The collar also has channels 34c which connect the aperture of collar 34a with the exterior thereof via an annular recessed region 34d. Through a fitting 41 air under pressure from an appropriate source is introduced via the recessed region 34d to the interior of the rotor housing. The air, after passing through channel 34c, can go upward and out of the machine via the grooves 34b and can also go downward in the clearance between the aperture in the collar 34 and the sleeve 42 (FIG. 5). Because of the grooves 34b turbulent pockets of air are produced therein and hence the upward air route is one of relatively high resistance compared to the smooth downward one. Consequently, most of the air will flow downward and thereby prevent minute particles of the material being processed from getting into the ambient atmosphere. At the same time a clearance for the sleeve 42 is provided thereby reducing tolerance requirements and heat generation.

Figure 2:
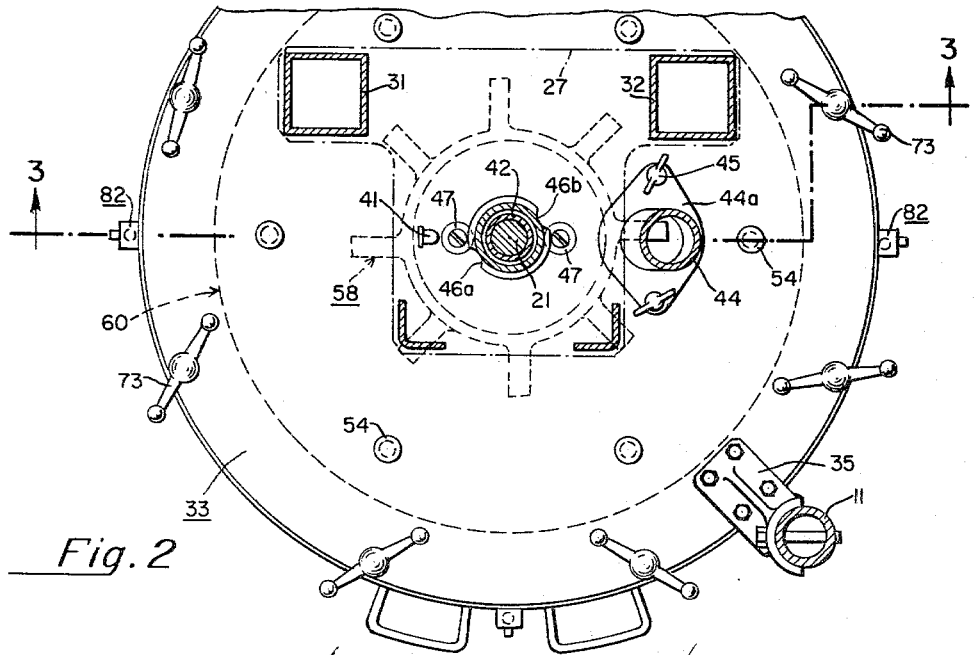
FIGURE 2 is a partly sectional plan view of the rotor housing, rotor, and hopper taken along the line 2—2 in FIG. 1 in the direction of the arrows shown.

The apparatus for mounting the top plate is particularly simple and novel. It will be seen from inspection of FIG. 3 that there are peripheral groove sections 34e cut into the outer surface of the collar 34a near the top edge thereof. It is also seen that there are two flat-headed bolts 47 which are screwed into apertures in the top member 33 and whose head portions engage the groove sections 34e. FIG. 2 shows that there are two arcuate cut-outs 46a and 46b in the upper edge of the collar 34a. When the top plate 34 as seen in FIG. 2 is rotated clockwise about 30°, the cutouts 46a and 46b will align with the edges of the flat head portions of the bolts 47 and permit the top plate 34 to be moved down and out of the machine (assuming, of course, that the rotor 60 and liner 50 have already been removed). As will be explained below, the top plate 34 is also supported from below by the liner 50.

Within a passage 43 (FIG. 3) in the top 33 there is disposed a readily demountable feed chute 44 having a flanged portion 44a which is larger than the passage 43 and rests on the top surface of member 33. The lower end 44b passes through an aperture in the top plate 34 which is aligned with passage 43. Thus, an exterior source of material may be in direct communication with the interior of the rotor housing. As shown in FIGS. 2 and 3 winged bolts 45 (or nuts in an alternative arrangement) screw into threaded apertures in member 33 to keep the chute 44 in position. This replaceable chute permits easy disassembly for cleaning after a particular material has been processed and enables the substitution of a previously cleaned chute in the interim thereby reducing the possibility of contamination of the next material to be processed.

Liner construction

FIGS. 3 and 6 show the liner 50 in relation to the nearby parts. It has a downwardly extending wall portion 50a against which the processed material is flung at high velocities after it has passed through the zone in which the impacting elements are located. Since this ring 50a is backed up on the outside by the top portion 70a of the hopper 70, it can withstand and contain the impacts of any metal pieces flung against it at high velocity which might otherwise destructively penetrate the walls of the apparatus and endanger personnel in its vicinity. These metal pieces could include broken-off impactors 51 and 60a. By employing this reenforced wall section there is no need for remote operation of the machine in an isolated barricade.

The upper surface of the peripheral portion 50b has formed therein a circular groove 50c within which a resilient O-ring 53 is disposed. Depending downwardly from the liner 50 are three circular rows of substantially cylindrical impacting elements 51. In the lower surface of the horizontal portion of the liner 50 are located three circular grooves 50d (FIG. 6) which accommodate the upper ends of the lower impactors 60a of the rotor 60. Toward the central part of the liner 50 near that portion thereof which supports the top plate 34 there is a circular groove 50e in which is disposed a resilient O-ring 59 which acts as a gasket when the liner 50 is pushed up against the top plate 34. The liner 50 is suspended by means of a plurality of knurled fastening bolts 54 (FIG. 3) which are passed through apertures in the top 33 into a corresponding number of sockets 55 which are welded or otherwise attached to the top of the horizontal surface of the liner 50. It is seen that there is a dead-air space between the top 33 and the liner which provides highly effective insulation against transmission of sound from the interior of the machine through the top 33.

After the liner 50 has been placed into position and the bolts 54 have been tightened, it will be seen that the top plate 34 is supported not only by the bolts 47 but also by the inner edge of the liner 50. As may be seen from FIG. 6, a clearance groove 56 is provided to permit vertical adjustability of the top plate 34 as the fastening bolts 54 are tightened.

Cutter-distributor

After the liner 50 has been fastened into position, the combined "cutter-distributor" and rotor assembly is affixed to the lower tapered end of the spindle 21 by means of a fastening nut 57. The cutter-distributor is indicated generally at the numeral 58 whereas the impacting section of the rotor is indicated generally by the numeral 60. Between the rotor 60 and the lower end of the input chute 44 are interposed the rotating blades 58a (FIGS. 2, 3 and 4) of the cutter-distributor 58. The cutter-distributor includes two identical disc-like members 58b and 58c which are welded to one another and each of which has four of the projecting blades 58a located in 90° space quadrature from one another. The two discs 58b and 58c are so disposed that the blades 58a of one are displaced approximately 45° from the blades of the other. Since the blades 58a are on a smaller circumference than the impacting elements, they operate at a substantially lower peripheral speed and can therefore reduce input particles which might otherwise damage the impacting elements if they were applied directly thereto.

"Flinger" disc

The cutter-distributor 58 also includes an upper "flinger" disc 58d of smaller diameter than the lower discs 58b and 58c, which has a plurality of radial grooves 58e formed therein (FIG. 4). When the disc 58d is rotated the grooves set up a centrifugal outward movement of air. The entire cutter-distributor 58 is mounted upon the hub portion 60c (FIG. 5) of the rotor 60 in any appropriate manner. For example, it has been found eminently practical to heat up the entire cutter-distributor 58 until it expands somewhat and then place it around the hub 60 and permit it to cool whereupon it contracts into a tight fit for the hub 60a. When the input material applied through the chute 44 consists of clumps or groups of smaller particles, they first will be impelled outwardly by the air current created by the action of the grooves 58e and by the air under pressure from channel 34c. They will then pass into the path of the blade projections 58a whose leading edges are so disposed that the particles are struck substantially perpendicularly. This will break up the agglomerates and promote mixing of the input material or materials. The leading edges of the projections 58a, as shown in FIG. 4, are aligned with the diameters of the discs 58b and 58c so as to aid in achieving a substantially 90° angle of impact. As may be seen by reference to FIG. 2, the projections 58a sweep approximately three quarters of the area just below the chute 44 as this has been found to give highly successful results.

Hopper construction

Figure 7:
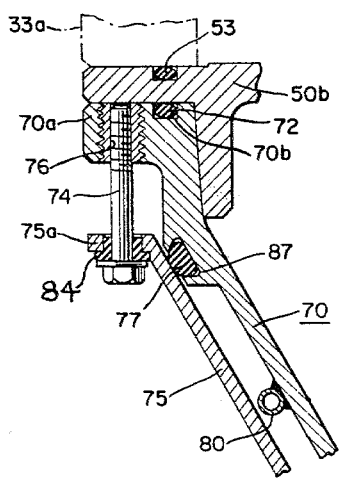
FIGURE 7 is a sectional view of part of the apparatus shown in FIG. 4 taken along the line 7—7 in FIG. 4 in the direction indicated by the arrows.

Referring now to FIGS. 1, 3 and 7, the construction of the hopper and its associated parts will now be considered. A hopper 70 is disposed under the rotor 60 and has an upper lip portion 70a which is held against the lower surface of portion 50b of the liner 50. There is a circular groove 70b in the upper surface of the portion 70a in which is disposed an O-ring 72 for sealing the junction of the hopper and the liner. Within this portion 70a there is also provided a number of vertical apertures 71 (FIG. 3) which are threaded. There are also a number of vertical Y-bolts 73 which pass through unthreaded apertures in the top portion 33a and through aligned unthreaded apertures in the portion 50b of the liner 50 until the lower threaded portions of bolts 73 engage the threads of the apertures 71. When the handles of the fastening bolts 73 are rotated, the hopper section 70a is pulled up against the section 50b and the resilient O-ring 72 is compressed to effect a tight seal.

As the speed of the rotor 60 and the rate at which the incoming material is applied to the processing area is increased, problems of noise and heat arise. There are a number of state laws which limit the amount of noise they may be generated by certain types of machines. For example, some state laws prohibit all noise levels in excess of 90 decibels in factories. It is therefore incumbent upon the builder of apparatus, such as is shown herein, to provide for noise insulation. One way that this objective can be achieved is shown in FIGS. 3 and 7 where an external wall 75 is shown which is spaced from the hopper itself so that the noise-deadening effects of a trapped air space may be employed. The wall 75 has an upper flanged portion 75a with unthreaded apertures therein in which bolts 74 with resilient shoulder washers 84 under their heads are inserted and screwed into the threaded apertures 76 in the portion 70a of the hopper. The wall 75 is spaced from the outer surface of the hopper 70 by means of two O-rings 77 and 78 placed within channels 87 and 88 respectively which are formed in, or affixed to, the outer surface of the hopper 70.

Noise and heat insulation

In the event that it is desired to control the temperature within the hopper 70, we provide means external to the hopper 70 for effecting heat exchange. These means comprise a spiral-wound pipe or conduit 80 which is welded to the outer surface of the hopper 70. It will be noted that the pipe 80 does not touch the inner surface of the wall 75 so that noise is not easily transmitted from the hopper to the wall 75. As shown in FIG. 1, there is an inlet pipe 81 and an outlet pipe 82 which do not communicate with the bore of the pipe 80 but rather with the spaces *between* adjacent turns of the pipe 80. The reason for this is that improved heat exchange will be attained with the tubing as a flow guide to give more uniform distribution at an even high surface velocity. If a refrigerating gas is applied to the inlet 81, it will move in a downward sprial path *between* the pipes 80. While the preferred path for the liquid or gaseous medium is *between* the turns of the tubing, when a difficult or dangerous medium is involved, it is advisable, though less efficient, to send it *through* the tubing. If relatively low flow rates of liquid media are used, it is advantageous to direct the fluid through the tubing first, then back between the turns, and so on, in sequence, in order to produce a very even temperature on the wall 70. In a typical installation the spiral-wound pipe system shown, using air with water mist cooling but no other thermal or noise insulation, reduced a noise level of 117 decibels to approximately 84 decibels so as to meet the applicable state law requirements.

The bottom of the hopper 70 has a generally cylindrical portion 70c and a lower lip 70d. These features permit a bag or resilient sleeve to be slipped over the lip 70d onto portion 70c which may then be surrounded by a resilient clamping member to keep the bag or sleeve on.

Assembly

To assemble the inner components of the rotor housing and the hopper is a relatively simple matter according to our invention. It will be assumed that only the rotor housing 33 is in place and that the top plate 34, the liner 50, the rotor 60 with the cutter-distributor 58, and the hopper 70 with its wall 75 are to be put on. The first thing that has to be done is to insert the top plate 34 around the shaft 21 and through the aperture in the top 33 and then to turn it approximately 30° so that the groove 34e is engaged by the two flat-headed bolts 47. The top plate 34 is now suspended and therefore the liner 50 is next pushed up under the top plate 34. Then a fastening lug 82 mounted within a threaded socket portion 82c, which is fixed to member 33a, is revolved to the position shown in FIG. 6 in solid lines. In this position its upper pin 82a supports the lower surface of the portion 50b. Next, the fastening bolts 54 are screwed into their respective sockets 55 with the result that the liner 50 is pulled upward until its two O-rings are tightly compressed by the portions 33a and the top plate 34 respectively. The next step is to put the cutter-rotor assembly on the lower extremity of the spindle 21 and affix it thereto by means of the nut 57. The last step is to put the hopper 70 with its wall 75 connected thereto up against the lower surface of the portion 50b and then to turn the lugs 82 180° as shown in phantom in FIG. 6 so that the pins 82b support the lower surface of the portion 70a of the hopper 70. After this has been done, the Y-bolts 73 are screwed in until they engage the apertures 71 in the portion 70a which causes the hopper to be raised until the O-ring 72 is compressed.

It should be appreciated that our novel machine has many advantages over prior art types. In the chemical industry, for example, where the same machine is to be used for a number of different chemicals in succession, it is important that successive chemicals are not contaminated, even to the extent of a few parts per million, by the chemicals previously processed in the machine. This objective is easily attained by using our invention since it is very easy to remove the chute (44), the demountable top plate (34), the liner (50), the cutter-rotor (58, 60) and the hopper for thorough cleaning and immediately to insert previously cleaned replacements therefor. Of course, this same demountability has advantages for general maintenance, replacement or repair apart from the use of the machine with successively different materials. If the materials are highly abrasive, the advantages of our novel construction are also put to use.

It should also be appreciated that the portion 50a of the liner may have any desired configuration or be constructed of any desired material. Furthermore, any number of rows of impactors 51 and 60a may be used and they may have any desired shape, or the rotor can employ any desired elements in addition to, or supplanting the cutter-distributor and/or the impacting elements.

Other modifications will be apparent to those skilled in the art which do not depart from the essence of our invention. Consequently, we desire our invention to be limited only by the claims herein.

We claim:

1. In apparatus in which a rotating member extends through an aperture in a housing member, the combination comprising:
   (a) a top plate having a disc-shaped portion and a central apertured collar portion projecting substantially perpendicularly therefrom, said collar portion being constructed and arranged to extend through the aperture in said housing member and to be releasably secured to said member, said top plate also having another aperture therein,
   (b) a liner releasably secured to said housing member and disposed in abutting relation to said top plate,
   (c) a demountable delivery chute extending through said housing member and through said other aperture of said top plate, and
   (d) a hopper releasably secured to said housing member in abutting relation to said liner.

2. In rotary processing apparatus having a rotating member disposed within a housing which comprises a housing member and a hopper releasably secured thereto:
   replaceable means for preventing material processed within said housing from impinging upon the inner surface of said housing member, said replaceable means also introducing material to be processed into said housing without impinging upon said inner surface,
   said replaceable means including a top plate having an apertured portion therein which extends through said housing member to permit a drive shaft for said rotating member to pass into said housing, said top plate also having another aperture therein,
   said replaceable means also including a liner held in abutting relation to said top plate,
   said replaceable means also including a means extending through said housing member and externally thereof and also through said other aperture in said top plate to introduce material to be processed into the interior of said housing.

3. In rotary processing apparatus having a rotating member disposed within a housing which comprises a housing member and a hopper releasably secured thereto:
   means interposed between the interior of said housing member and said hopper for preventing material processed within said housing from impinging upon said housing member, said preventing means including a portion disposed between the edges of said housing member and said hopper, and
   means extending through said housing member and said preventing means for introducing material to be processed into the interior of said housing without impinging upon said housing member, said introducing means being releasably secured to said housing member.

4. The apparatus according to claim 3 wherein said means interposed between the interior of said housing member and said hopper comprises a first substantially annular member having a centrally located collar portion projecting perpendicularly thereto and also includes a second substantially annular member demountably connected to said housing member, the inner peripheral portion of said second annular member being constructed and arranged to exert pressure upwards against the lower surface of said first annular member, wherein the portion of said preventing means disposed between the edges of said housing member is the outer peripheral portion of said second substantially annular member, and wherein the edges of said hopper, said housing member and said outer peripheral portion of said second annular member are held together by a plurality of fastening means which pass through respective aligned apertures therein.

5. The apparatus according to claim 4 wherein the portion of said second substantially annular member between said inner and outer peripheral portions thereof includes a plurality of material-processing elements extending downward therefrom.

6. Rotary processing apparatus comprising, in combination:
   (a) a housing member having a first aperture therein through which a rotating member may extend and also having a second aperture therein,
   (b) demountable delivery means mounted through said second aperture for delivery of materials to be processed,
   (c) a top plate which includes a portion thereof having an aperture, said portion being mounted through said first aperture, said top plate also having a second aperture therein through which said delivery means also extends,
   (d) a liner which is releasably secured to said housing member and is disposed in abutting relation to said top plate and to said housing member, and
   (e) a hopper disposed in abutting relation to said liner and being releasably secured to said housing member.

7. Rotary processing apparatus comprising, in combination:
   (a) a housing member having first and second apertures therein,
   (b) a top plate having at least an apertured portion thereof which extends through said first aperture and is releasably secured to said housing member, said apertured portion permitting a rotating member to be introduced into said housing member, said top plate having another aperture therein aligned with said second aperture,
   (c) a delivery chute which extends through said aligned apertures and is releasably secured to said housing member,
   (d) a liner releasably secured to said housing member and disposed in abutting relation to said top plate and to said housing member, and
   (e) a hopper releasably secured to said housing member in abutting relation to said liner, the junctions of said top plate, liner and hopper being sealed to assist in preventing material processed by said rotating member from impinging upon said housing member.

8. Rotary processing apparatus comprising:
   (a) a housing member having a substantially central aperture therein through which a rotating member may extend, said housing member also having another aperture therein,
   (b) a top plate having a substantially disc-shaped portion and a central collar portion extending normal thereto which is adapted to be mounted through the central aperture of said housing member, said top plate also having a second aperture aligned with the other aperture of said housing member, said top plate being constructed to have its collar portion releasably secured to said housing member when said collar portion is placed through the central aperture of said housing member,
(c) a delivery chute which passes through said aligned apertures and is releasably secured to said housing member,
(d) a liner releasably secured to said housing member in abutting relation to the disc-shaped portion of said top plate and sealed at its junction therewith, and
(e) a hopper abutting said liner and sealed at its junction therewith, said hopper being constructed to be releasably secured to said housing member.

9. The apparatus according to claim 8 wherein said housing member has a selected number of lateral projections extending inward from said central aperture and the outer surface of said central collar portion has a corresponding number of grooves formed therein in which said projections are adapted to fit, said collar portion also having a corresponding plurality of upper cutaway portions which communicate with said grooves and are so dimensioned as to permit said collar portion to be withdrawn from said central aperture when said top plate is rotated to the point where said projections and said cutout portions are aligned with one another.

10. The apparatus according to claim 8 in which said first housing member has peripherally-located rotatable lugs for supporting said liner and said hopper respectively as a function of the rotary position of said lug.

11. The apparatus according to claim 8 with the addition of a rotor assembly mounted through the central aperture of said housing member, said rotor having a first plurality of processing elements located peripherally thereupon, said rotor assembly also including a second plurality of processing elements constructed to rotate below the lower edge of said delivery chute in a plane substantially perpendicular to the axis of said chute and to strike incoming material substantially perpendicularly to the direction in which said material is applied to said rotor assembly and before said material is flung outwardly by said rotor assembly to be subjected to the action of said first plurality of processing elements thereupon.

12. The apparatus according to claim 11 wherein said second plurality of elements includes a selected number of projections at the outer rim of a disc-like member having substantially straight leading edges which are substantially aligned with the diameters of said disc-like member.

13. The apparatus according to claim 12 with the addition of means mounted coaxially with the other parts of said rotor assembly and being constructed, in response to rotation of said assembly, to produce an outward flow of the atmosphere in which said assembly is located thereby to aid in directing materials to be processed outward toward said first plurality of processing elements.

14. The apparatus according to claim 13 wherein said flow-producing means comprises a disc-shaped member having a plurality of radial grooves in its upper surface, the lower surface of said member being in contact with the upper surface of the disc-like member to which said second plurality of elements are mounted.

15. Rotary processing apparatus comprising:
(a) a housing member having a first substantially central aperture and also having a second aperture therein,
(b) a substantially annular top plate having a disc-shaped portion and a central collar portion extending normal thereto, said collar portion being constructed and arranged to be mounted through the first aperture of said housing member and constructed to be releasably secured to said member, said top plate also having a second aperture constructed to be aligned with the second aperture of said housing member, said collar portion having an axial bore for enabling the driveshaft of a rotating member to pass through it,
(c) a delivery chute mounted on top of said housing member and being releasably secured thereto, said delivery chute having a portion thereof which passes through said aligned apertures,
(d) a substantially annular liner releasably secured to said housing member in abutting relation to the disc-shaped portion of said top plate and also to said housing member, and
(e) a hopper disposed below said liner and in abutting relation thereto and constructed to be releasably secured to said housing member, said hopper having a discharge aperture therein, said top plate, liner and hopper being sealed at their junctions so as to define a processing chamber in which material applied thereto cannot escape from said chamber through said junctions.

16. The rotary processing apparatus according to claim 15:
wherein said annular liner includes a plurality of downwardly-extending impacting elements and said liner is mounted from its upper surface to a plurality of fasteners extending downward from said housing member, and
wherein said housing member, liner, and hopper are clamped together by means of a plurality of fasteners extending downward through aligned apertures in the peripheral portions thereof.

17. The rotary processing apparatus according to claim 15 with the addition of tubing spirally wound around the external surface of said hopper and in contact therewith and a wall surrounding said tubing but spaced therefrom and being connected at selected points to the exterior of said hopper, and input and output pipes disposed in said wall and which communicate with the spaces between said tubing.

18. The processing apparatus according to claim 15 wherein said housing member is provided at its periphery with a plurality of rotatable lugs constructed and arranged to support said liner in one rotary position thereof and to support said hopper in another rotary position thereof.

19. Rotary processing apparatus comprising:
(a) a substantially circular housing member having a first substantially central aperture therein and also having a second aperture therein,
(b) a substantially annular top plate disposed below said housing member and having a disc-like portion and a central collar portion extending upward therefrom and normal thereto, said collar portion being constructed and arranged to be mounted through said first aperture and having a groove in the outer portion thereof for releasably securing said collar portion to said housing member, said top plate also having a second aperture constructed and arranged to be aligned with the second aperture of said housing member, said collar portion having an axial bore through which a rotating member can extend into said housing member,
(c) a delivery chute releasably secured to the top of said housing member, said delivery chute having a portion thereof which passes through said aligned apertures,
(d) a substantially annular liner suspended from said housing member, said annular liner having an inner circular upstanding wall portion in contact with the lower surface of said disc-like portion and a downwardly extending peripheral wall portion, said liner having a substantially horizontal circular portion outwardly of said downwardly wall portion and adjacent thereto, and
(e) a hopper having an upper flanged portion constructed to fit against the lower surface of said horizontal portion of said liner and also against the outer surface of said downwardly-extending wall, said hopper being releasably secured to said housing member and having an aperture therein by which processed material may be discharged, and means for sealing the junctions of said hopper, liner and top plate whereby said last named elements define a processing chamber in which material therein cannot escape said chamber via said junctions.

20. A rotor for rotary processing apparatus comprising, in combination:
a first portion having a central surface region whereof which is adapted to receive particles of material to be processed and also having a second peripheral portion in which are located a number of processing elements, and
means including projecting members adapted to be disposed in the path of said material for striking said particles substantially perpendicularly to the direction in which said particles are applied to said central receiving surface, said means being spaced from said first and second portions and being adapted to strike said particles before they impinge on said surface.

21. A rotor for rotary processing apparatus comprising in combination: a substantially circular first member having a plurality of elements at its periphery for processing particulate materials, said first member also including a central surface for receiving said particulate materials and directing them outwardly toward said processing elements, and a second member including a plurality of peripherally located rotating projections which are adapted to be positioned in the path of the incoming particulate materials and constructed to strike said incoming materials substantially perpendicularly to the direction in which said particles are applied to said central surface, said first and second members being disposed coaxially with and spaced from one another.

22. A rotor for rotary processing apparatus comprising in combination:
(a) a substantially circular first portion having a plurality of impacting elements at its periphery, said impacting elements being mounted to extend substantially perpendicularly to said first portion, and
(b) a second portion mounted in association with said first portion so as to rotate therewith, said second portion including a plurality of rotating projections mounted at the periphery of a central disc-shaped region, said projections being located substantially more toward the axis of said rotor than said impacting elements are, said projections having leading edges which are substantially straight and aligned with diameters of said disc-shaped region.

23. The rotor according to claim 22 with the addition of means mounted coaxially with said second portion for producing an outward flow of the atmosphere in which said rotor is used to assist in directing the material to be processed by said rotor toward said impacting elements.

24. The rotor according to claim 23 wherein said coaxially mounted means is substantially disc-shaped and has a selected number of radially disposed grooves in the upper surface thereof, the lower surface of said means being disposed in intimate contact with the upper surface of said central disc-shaped region of said second portion.

25. In rotary processing apparatus having a rotating member which is disposed in an enclosure, said enclosure comprising a housing member and a hopper releasably secured thereto, the combination comprising:
(a) means within said housing member and demountable therefrom for preventing material processed in said enclosure from impinging upon said housing member, said preventing means including means for releasably securing it in abutting relation to said housing member, said securing means having a portion external to said housing member, said preventing means also including a collar portion which is disposed in a first aperture in said housing member,
(b) demountable material input means disposed in a second aperture in said housing member and in an aperture in said preventing means aligned with said first aperture, and
(c) a hopper releasably secured to said housing member.

References Cited by the Examiner

UNITED STATES PATENTS

| | | | |
|---|---|---|---|
| 247,206 | 9/81 | McAuley | 241—188 |
| 1,947,953 | 2/34 | Otto. | |
| 2,498,209 | 2/50 | Iredale | 241—65 |
| 2,651,470 | 9/53 | Dodds et al. | 241—275 |
| 2,867,387 | 1/59 | Dodds et al. | 241—275 |
| 2,879,004 | 3/59 | Dodds et al. | 241—275 |

J. SPENCER OVERHOLSER, *Primary Examiner.*

EDWARD J. MICHAEL, *Examiner.*